United States Patent

[11] 3,610,669

| [72] | Inventor | Thomas N. Morrissey, Sr.<br>P.O. Box 775, Little Rock, Ark. 72203 |
|---|---|---|
| [21] | Appl. No. | 832,346 |
| [22] | Filed | June 11, 1969 |
| [45] | Patented | Oct. 5, 1971 |

[54] REMOVABLE AND COLLAPSIBLE VEHICLE SIDE PROTECTOR
18 Claims, 11 Drawing Figs.

[52] U.S. Cl. ................................................. 293/62,
280/150 R
[51] Int. Cl. ...................................................... B60r 27/00
[50] Field of Search............................................ 280/150 B,
150 C, 150; 293/1, 62, 71, 71 P, 54 D; 114/219,
220; 24/255.1; 224/42.03, 42.04, 42.05, 421 G

[56]  References Cited
UNITED STATES PATENTS

| 2,276,313 | 3/1942 | Keppel | 24/255.1 X |
| 2,433,569 | 12/1947 | Marchal | 114/219 |
| 2,543,404 | 2/1951 | Harasty | 114/219 |
| 2,907,506 | 10/1959 | Sammons | 224/42.1 |
| 3,211,123 | 10/1965 | Foss | 293/1 X |

FOREIGN PATENTS

| 1,077,058 | 4/1954 | France | 293/62 |
| 18,925 | 1909 | Great Britain | 24/255.1 |

Primary Examiner—Leo Friaglia
Assistant Examiner—Winston H. Douglas
Attorneys—Clarence A. O'Brien and Harvey B. Jacobson ABSTRACT: An elongated longitudinally extendible protector body for suspension in horizontal attitude along and from the side of a vehicle body adjacent the elevation of maximum width of the vehicle body. The protector body is constructed of resilient material and will therefore protect the vehicle body from direct impact from adjacent vehicle doors being swung there toward.

PATENTED OCT 5 1971

Thomas N. Morrissey, Sr.
INVENTOR.

BY Clarence A. O'Brien
and Harvey B. Jacobson
Attorneys

Thomas N. Morrissey, Sr.
INVENTOR

REMOVABLE AND COLLAPSIBLE VEHICLE SIDE PROTECTOR

When an automobile is parked in a location alongside of which one or more adjacent vehicles may be parked, the vehicle is subject to the free-swinging edge portions of the doors of the adjacent vehicles being swung into impact therewith.

While parking lots could be arranged so as to provide sufficient distance between parked cars to enable the doors of the cars or automobiles to be swung to the wide-open positions without striking the adjacent automobiles, such spacing between adjacent parked cars would be excessive and substantially reduce the number of cars which can be parked on a parking lot. Accordingly, some other means, other than providing additional spacing between parked cars, needs to be provided so as to prevent the vehicle door of one vehicle from sharply impacting with the side of an adjacent vehicle as the door is swung toward its open position.

It is therefore the main object of this invention to provide an assemblage which may be utilized by the owners of vehicles who do not wish the doors of adjacent parked vehicles to be swung into sharp impact with the sides of their vehicles.

Another object of this invention is to provide a vehicle side-protective device in accordance with the immediately preceding object and in the form of an elongated horizontally disposed resilient body which may be readily supported from the side of a vehicle to be protected.

Another object of this invention is to provide an elongated protective body including support means therefor which may be utilized to support the body in a readily removable manner from the side of a vehicle to be protected.

Still another object of this invention is to provide a vehicle body protector in accordance with the preceding objects and which is constructed in a manner whereby it may be collapsed for ready storage in a compact state.

A further object of this invention is to provide an elongated vehicle body protector constructed in a manner whereby it may be readily removably supported from the sides of associated vehicles in a plurality of different ways.

A further object of this invention is to provide an elongated vehicle body protector which may be readily constructed of various lengths so as to be readily adaptable for use on vehicles of different lengths.

A final object of this invention to be specifically enumerated herein is to provide a vehicle body protector in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
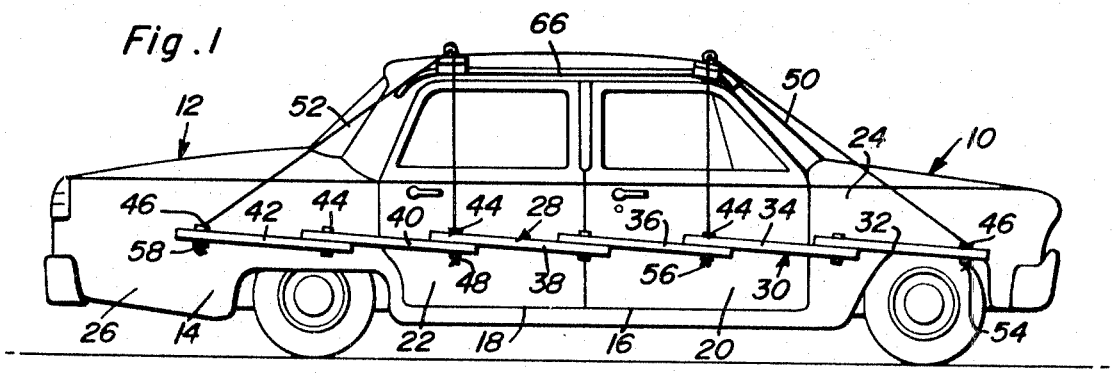
FIG. 1 is a side elevational view of a conventional four-door passenger vehicle with a first form of the collapsible vehicle side protector of the instant invention operatively associated therewith.

Referring now more specifically to the drawings, the numeral 10 generally designates a conventional form of passenger vehicle including a body referred to in general by the reference numeral 12. The body 12 includes opposite sides 14 in each of which front and rear door openings 16 and 18 are formed. A front door 20 is mounted in each front door opening 16 and a rear door 22 is mounted in each rear door opening 18. In addition, the sides 14 each include front and rear fenders 24 and 26.

When the vehicle 10 is parked adjacent a vehicle, the doors 20 and 22 and the fenders 24 and 26 of the side of the vehicle parked adjacent the other vehicle are subject to having the adjacent door or doors of the other vehicle swinging into contact therewith. Of course, when the free-swinging edge of one vehicle door swings into sharp contact with an adjacent vehicle body portion, the adjacent vehicle body usually has a chip of paint removed therefrom, and if the paint-chipping process is repeated the side of a vehicle from which paint has been chipped is soon marred to the extent that its appearance is adversely affected. Further, the chipping of paint from the side of a vehicle can result in the metal in the areas from which paint has been chipped rusting.

Figure 3:
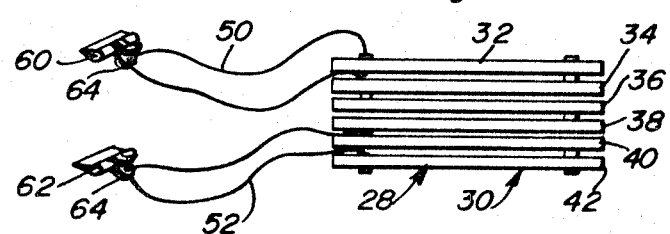
FIG. 3 is an elevational view of the side protector in a fully collapsed position.
Figure 2:
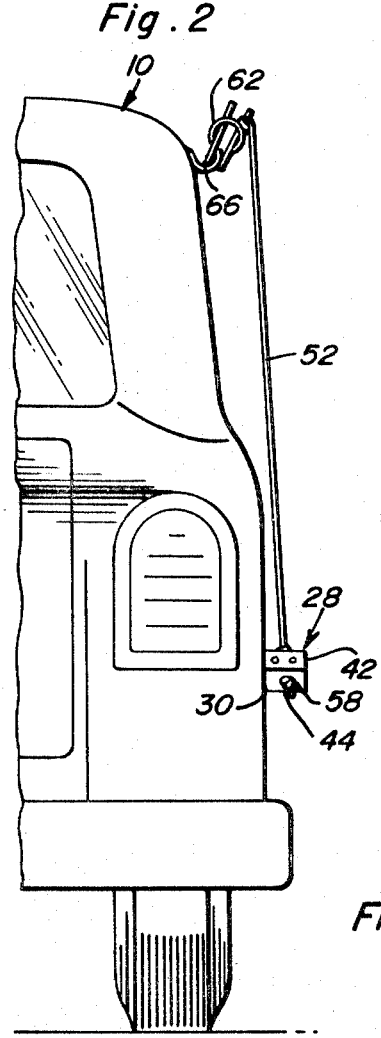
FIG. 2 is a fragmentary rear elevational view of the assemblage illustrated in FIG. 1 shown on somewhat of an enlarged scale.
Figure 4:
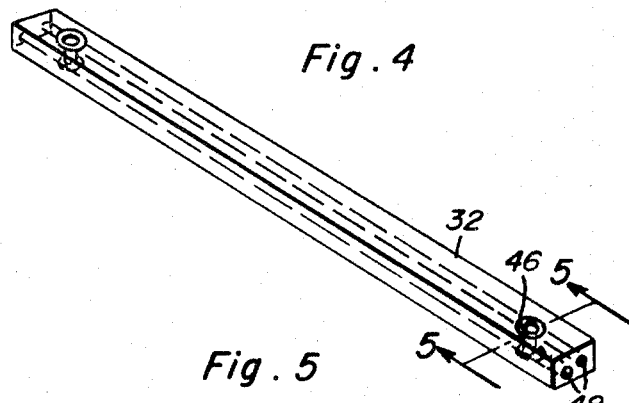
FIG. 4 is a perspective view of one of the body sections of the protector.
Figure 5:
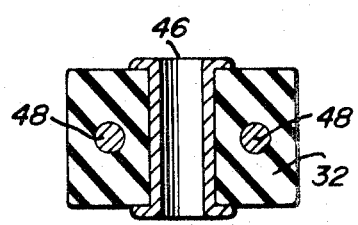
FIG. 5 is an enlarged transverse vertical sectional view taken substantially upon the plane indicated by the section line 5—5 of FIG. 4.

The side protector of the instant invention is generally designated by the reference numeral 28 in FIGS. 1–3 of the drawings and includes a body assembly referred to in general by the reference numeral 30. The body assembly 30 includes a plurality of body sections 32, 34, 36, 38, 40 and 42. One pair of ends of the sections 40 and 42 are pivotally secured together by hollow rivets 44 secured therethrough and the adjacent ends of the sections 38 and 40, the sections 36 and 38, the sections 34 and 36 and the sections 32 and 34 are also pivotally secured together in a similar manner. In addition, the remote ends of the sections 32 and 42 have shorter rivets 46 secured therethrough, see FIGS. 4 and 5.

Each of the sections 32, 34, 36, 38, 40 and 42 comprises an elongated body of resilient material such as reasonably stiff rubber and each of the bodies has a pair of elongated longitudinally extending and transversely spaced reinforcing rods 48 secured therethrough.

A pair of elongated flexible tension members 50 and 52 are provided and one end of the tension member 50 is secured through the forward tubular rivet 46 and knotted as at 54 while the other end of the tension member 50 is secured through the tubular rivet 44 pivotally connecting the section 34 to the section 36 and knotted as at 56. Further, the tension member 52 has one end thereof secured through the rear tubular rivet 46 and knotted as at 58 and the other end thereof secured through the tubular rivet 44 connecting the section 38 to the section 40 and knotted as at 48. A pair of conventional "bulldog" clamps 60 and 62 are secured to the midportions of the tension members 50 and 52 by first looping the midportions of the tension members 50 and 52 about and through one apertured handle 64 of the clamps 60 and 62 before securing the ends of the tension members 50 and 52 through the corresponding rivets 44 and 46. In this manner, the clamps 60 and 62 are prevented against axial displacement longitudinally of the tension members 50 and 52 although the tension members 50 and 52 may be manually manipulated so as to adjust the clamps 60 and 62 therealong.

In operation, the side protector 28 may be readily folded into a compact state such as that illustrated in FIG. 3 of the drawings and stored in a relatively small space. However, when it is desired to use the protector 28, it is unfolded to the extended position thereof illustrated in FIG. 1 of the drawings and the clamps 60 and 62 are removably clampingly engaged with opposite end portions of the drip or rain gutter 66 extending along the corresponding side of the vehicle 10. It will be noted that the side protector 28 is supported in a generally horizontally disposed position in substantial horizontal alignment with the widest portion of the vehicle body 14.

Figure 11:
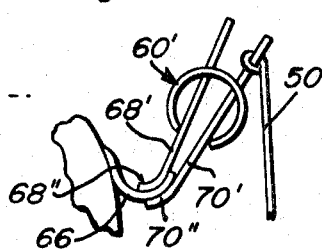
FIG. 11 is an enlarged fragmentary elevational view of a second form of "bulldog" clamp utilized to support the side protector from a vehicle drip rail or rain gutter.
Figure 10:
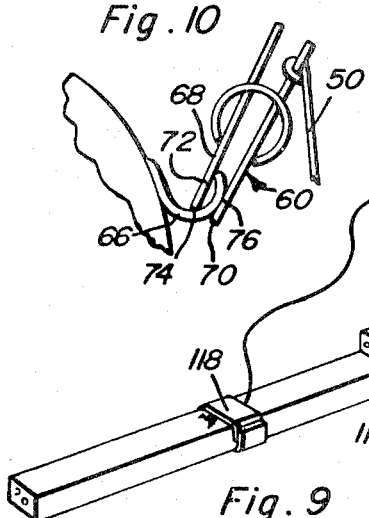
FIG. 10 is a fragmentary elevational view illustrating one form of "bulldog" clamp utilized to support the side protector from the drip rail of the vehicle.

With attention now invited more specifically to FIGS. 10 and 11 of the drawings, it may be seen that the "bulldog" clamps 60 and 62, represented by the clamp 60 in FIG. 10, include generally planar jaw members 68 and 70 which enjoy three points of contact 72, 74 and 75 with the rain gutter 66. However, a modified form of "bulldog" clamp may be seen to be illustrated in FIG. 11 of the drawings and generally designated by the reference numeral 60'. The clamp 60' includes a pair of jaw members 68' and 70' which correspond to the jaw members 68 and 70 but which include free edge portions 68'' and 70'' which are arcuate and therefore conform to the cross-sectional shape of the associated drip rail or rain gutter 66.

Figure 6:
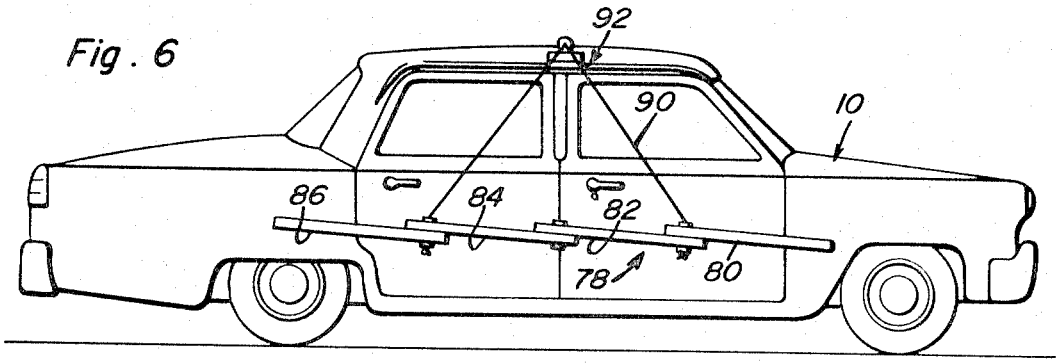
FIG. 6 is a side elevational view of a conventional four-door vehicle illustrating a second four-sectional side protector supported from the vehicle.
Figure 7:
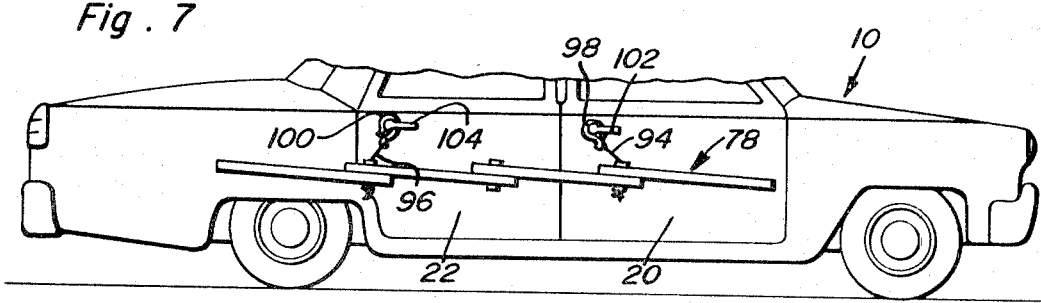
FIG. 7 is a fragmentary side elevational view similar to FIG. 6 but illustrating an alternate manner of supporting the four-sectional side protector from the vehicle.

With attention now invited more specifically to FIG. 6 of the drawings there may be seen a modified form of side protector referred to in general by the reference numeral 78 and which is substantially identical to the side protector 28 except that the protector 78 includes only four sections 80, 82, 84 and 86. In addition, the protector 78 includes only one tension number 90 having a single "bulldog" clamp 92 secured thereto. Further, in FIG. 7 of the drawings there may be seen an alternate manner of mounting the side protector 78 wherein a pair of short tension members 94 and 96 are utilized in lieu of the tension member 90 and the upper ends of the tension members 94 and 96 are provided with hooks 98 and 100 for engagement about the front and rear door handles 102 and 104 of the doors 20 and 22.

Figure 8:
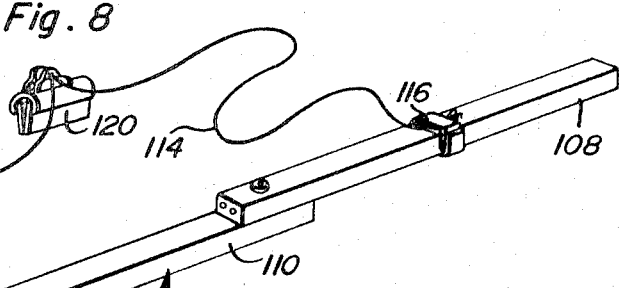
FIG. 8 is a perspective view of a three-sectional protector.
Figure 9:
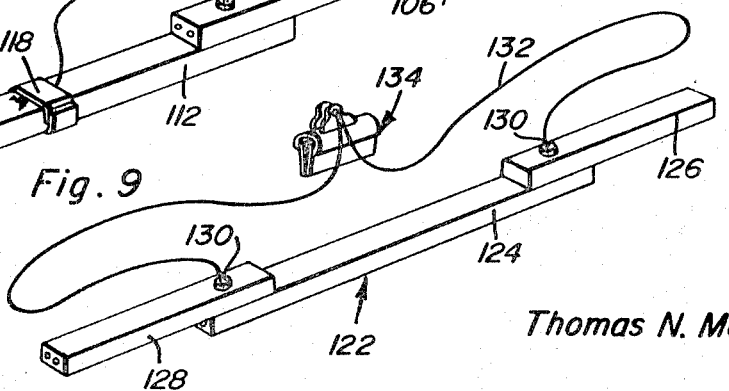
FIG. 9 is a perspective view of a modified form of a three-sectional protector.

With attention now invited to FIG. 8 of the drawings there may be seen a further form of side protector referred to in general by the reference numeral 106 and which includes three sections 108, 110 and 112 pivotally joined together and including a single suspension tension member 114 whose opposite ends are clamped to the sections 108 and 112 by means of clamps 116 and 118, respectively. The center portion of the tension member 114 has a "bulldog" clamp 120 similar to the "bulldog" clamps 60, 62 and 92 secured thereto. Finally, with attention invited more specifically to FIG. 9 of the drawings, there may be seen a final form of side protector to be specifically described herein and which is generally designated by the reference numeral 122. The protector 122 includes a center section 124 and a pair of opposite end sections 126 and 128 which are overlapped with and pivotally secured to the opposite ends of the center section 124 by means of hollow rivets 130 similar to rivets 44. The protector 122 includes a single tension member 132 provided with a central "bulldog" clamp 134 and it will be noted that the length of each of the end sections 126 and 128 from its outer end to the corresponding rivet 130 is less than half the spacing between the rivets 130 whereby the free ends of the end sections 126 and 128 may be swung around into closely adjacent positions so as to overlie the center section 124. Thus, the side protector 122 may be folded into a compact state in a slightly different manner.

The side protectors 78, 106 and 122 do not have rivets secured through the free ends of the end sections thereof inasmuch as the corresponding tension members 90, 94, 114 and 132 are not secured through the free ends of the end sections. Further, the sections of each of the side protectors are constructed of resilient material and provided with pairs of transversely spaced reinforcing rods such as rods 48 and each of the various "bulldog" clamps is secured to the corresponding tension member in a manner preventing removal of the bulldog clamp unless one of the ends of the tension members is untied from the corresponding side protector section and unthreaded through the apertured thumb engageable portion of the "bulldog" clamp. Also, it is to be understood that clamps other than "bulldog" clamps may be used, if desired. Such other clamps may include various conventional types such as common clothespins which may be used advantageously in connection with certain vehicles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A protector for the side of a vehicle, said protector including an elongated horizontal body constructed of stiff but resilient material, and a pair of upstanding tension member sections connected at their lower ends to said elongated body at points spaced longitudinally therealong and adapted at their upper ends for attachment to upper portions of the vehicle for suspension of the protector body in general horizontal disposition alongside the vehicle, said elongated body including a plurality of end overlapped body sections pivotally secured together at overlapped end portions thereof for oscillation about upstanding axes and swinging toward relative collapsed and stacked positions, at least some of said overlapped end portions being pivotally secured together by hollow rivets secured through said overlapped end portions, said lower ends of said tension member sections each being secured through one of said rivets.

2. A protector for the side of a vehicle, said protector including an elongated horizontal body constructed of stiff but resilient material, and a pair of upstanding tension member sections connected at their lower ends to said elongated body at points spaced longitudinally therealong and adapted at their upper ends for attachment to upper portions of the vehicle for suspension of the protector body in general horizontal disposition alongside the vehicle, said elongated body including a plurality of vertically stacked and end overlapped body sections pivotally secured together at overlapped end portions thereof for oscillation about upstanding axes and swinging toward relative collapsed and stacked positions.

3. The combination of claim 2 including clamp means adapted for removable clamped engagement with said upper vehicle portion and to which said upper ends are anchored.

4. The combination of claim 3 wherein said tension member sections are joined at their upper ends to form a single tension member, said tension member and clamp means including coacting portions frictionally resisting longitudinal shifting of said tension members relative to said clamp means but enabling intentional manual longitudinal shifting of said tension members relative to said clamp means.

5. The combination of claim 2 wherein said lower ends are anchored relative to members secured to the body sections defining the opposite ends of said body.

6. The combination of claim 2 wherein the lower ends of said tension member sections are anchored to at least every other body section.

7. The combination of claim 2 wherein said body sections each includes elongated rigid reinforcing members embedded therein and extending longitudinally therealong.

8. The combination of claim 2 wherein the upper ends of said tension member sections include hook members adapted for removable engagement with longitudinally spaced door handles of a vehicle.

9. The combination of claim 2 including clamp means adapted for removable clamped engagement with said upper vehicle portion and to which said upper ends are anchored, said clamp means each comprising a conventional "bulldog" clamp.

10. The combination of claim 9 wherein said clamp means each includes an apertured finger engageable portion through and about which said upper ends of said tension member sections are secured.

11. The combination of claim 10 wherein said upper ends of said tension member sections are joined by a portion integral with said sections.

12. The combination of claim 2 including clamp means adapted for removable clamped engagement with said upper vehicle portion and to which said upper ends are anchored, said clamp means each comprising a conventional "bulldog" clamp, said "bulldog" clamp including a pair of concavo-convex jaw members adapted to clampingly engage the outer marginal edge of a trough-shaped rain gutter extending along said upper vehicle portion.

13. In combination, an elongated protector including more than three end-overlapped and end-aligned stiff body sections constructed of resilient material and having their overlapped end portions pivotally secured together in vertically stacked relation for relative swinging about upstanding axes toward fully collapsed and vertically stacked relation, and at least a pair of of upstanding tension member sections connected at their lower ends to selected sections of said body and adapted at their upper ends for attachment to upper portions of a vehicle for suspension of the protector in general horizontal disposition alongside the vehicle.

14 The combination of claim 13 wherein at least some of said overlapped end portions are pivotally secured together by hollow rivets secured through said overlapped end portions, said lower ends of said tension member sections each being secured through one of said rivets.

15. The combination of claim 13 wherein said body sections each includes elongated rigid reinforcing members embedded therein and extending longitudinally therealong.

16. A protector for the side of a vehicle, said protector including an elongated horizontal body constructed of stiff but resilient material, and a pair of upstanding tension member sections connected at their lower ends to said elongated body at points spaced longitudinally therealong and adapted at their upper ends for attachment to upper portions of the vehicle for suspension of the protector body in general horizontal disposition alongside the vehicle, said elongated body including four end-overlapped elongated body sections pivotally secured together at overlapped end portions thereof for oscillation about upstanding axes and swinging toward relative collapsed and stacked positions, said tension member sections being secured at their lower ends to the adjacent ends of the endmost body sections and the remote ends of the center two body sections disposed in end overlapped relation with said adjacent ends.

17. The combination of claim 16 wherein said overlapped adjacent and remote ends are pivotally secured together by hollow rivets secured therethrough, said lower ends of said tension member sections being secured through the corresponding rivets.

18. The combination of claim 17 wherein said tension member sections are joined at their upper ends to form a single tension member, said tension member and clamp means including coacting portions frictionally resisting longitudinal shifting of said tension members relative to said clamp means but enabling intentional manual longitudinal shifting of said tension members relative to said clamp means.